No. 751,433. PATENTED FEB. 2, 1904.
W. J. KENNEDY.
STEAM COOKER.
APPLICATION FILED JUNE 29, 1903.
NO MODEL.
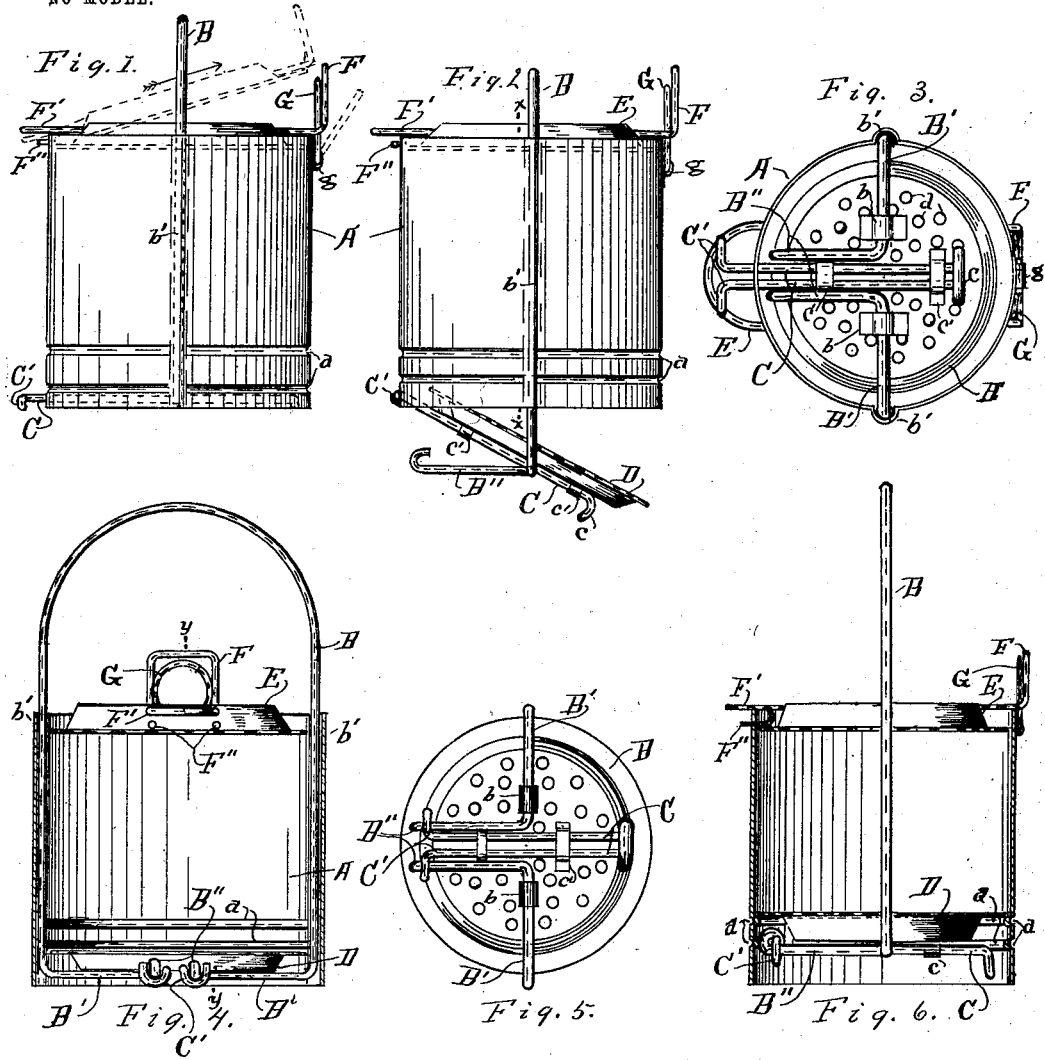
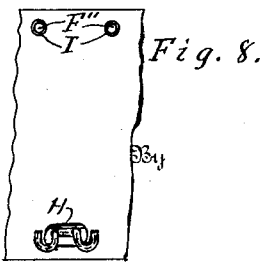
Witnesses
C. V. Cilley.
Edward L. Gough.
Inventor
Walter J. Kennedy
Ichiel J. Cilley
Attorney No. 751,433.

Patented February 2, 1904.

UNITED STATES PATENT OFFICE.

WALTER J. KENNEDY, OF GRAND RAPIDS, MICHIGAN.

STEAM-COOKER.

SPECIFICATION forming part of Letters Patent No. 751,433, dated February 2, 1904.

Application filed June 29, 1903. Serial No. 163,624. (No model.)

*To all whom it may concern:*

Be it known that I, WALTER J. KENNEDY, a citizen of the United States, residing at Grand Rapids, in the county of Kent and State of Michigan, have invented certain new and useful Improvements in Steam-Cookers, of which the following is a specification.

My invention relates to improvements in appliances for cooking vegetables and other foods by the use of boiling water or steam; and its objects are, first, to provide a cooker having an adjustable bottom that may be readily opened and closed by manipulating the bail of the cooker; second, to provide a cooker with which the bottom may be readily secured rigidly to the bail and the cooker immediately converted from a vegetable-boiler to a steamer for oatmeal, &c., and, third, to provide a cooker with which the cover may be held open without danger of scalding the hands of the operator. I attain these objects by the mechanism illustrated in the accompanying drawings, in which—

Figure 1 is an elevation of the cooker with the bottom closed. Fig. 2 is the same with the bottom open. Fig. 3 is a bottom plan of the same. Fig. 4 is a sectional elevation of the same on the line X X of Fig. 2. Fig. 5 is a bottom plan of the bottom, showing the means for locking it securely to the bail. Fig. 6 is a vertical section of the cooker on the line y y of Fig. 4. Fig. 7 is an elevation of the cover; and Fig. 8 is a section of the case, showing the apertures for the latch and top.

Similar letters refer to similar parts throughout the several views.

A represents the case or metal pail, that supports the top, bottom, and bail of the cooker.

B represents the bail, which is made considerably longer than the case and is detachable therefrom by sliding it longitudinally through the receptacle $b'$ in the case. The lower end of the bail is bent at right angles to form the arms B', which are pivotally secured to the bottom D, as at $b$ in Figs. 3 and 5, when it is again bent at right angles, forming the arm B'', that projects out nearly to the inner surface of the case.

The latch C is secured to the bottom D between the arms B'' by means of loops $c'$, so that it may be slid lengthwise, and is provided at one end with hooks projecting outward at right angles, so that they may be made to pass through an aperture H in the case, as indicated in Figs. 1, 2, and 8, so that when the bail is pressed down, as in Fig. 2, the hooks C' will act as stops against the case to cause the bottom to stand open at an angle, as indicated in Fig. 2, for the purpose of discharging vegetables, &c., from the cooker, and when the bail is drawn up to its normal position the latch will slide in the aperture through the case and allow the bottom D to swing to place upon the lower edge of the lower bead $a$ in the case A in position to form a bottom for the cooker.

To remove the bottom D from the case A, the ends C' of the latch are pressed together, so that they may be removed from the aperture H through the side of the case, after which the bottom D may be thrown against the arms B'' of the bail B, where it is locked to place by drawing the latch C back until the hooks C' pass over the ends of the arms B'', as indicated in Figs. 5 and 6, which holds the bottom securely to place at right angles with the bail. In this form I find it convenient to remove the bail and bottom by passing the bail down through the case and entering it from the top of the case and passing it down until the bottom rests upon the upper edge of the upper bead $a$ for the purpose of converting it into a steamer for cooking oatmeal, &c.

The cover E is attached to the case A by resting the supporting-wire F' upon the top of case and passing the wires F'' through the apertures I in the case. (See Fig. 8.) The opposite end of the supporting-wire F' is made to rest on the opposite edge of the case, and the end is bent up, as at F, forming a loop to take hold of with the hand to open the cover, and I pivot a ring G to the case A, as at $g$, so that it may be swung through the loop F and hold the cover E to place. If it is desired to look into the cooker, the cover E may be raised, as indicated by the dotted lines in Fig. 1, and to remove the cover it may be drawn in the direction indicated by the arrow in this figure. When opening the cover, as indicated in Fig. 1, the hand clasping the bail B and the loop F of the cover is protected from danger of being scalded with hot steam from the cooker by the interposition of the cover E between the hand and the escaping steam.

I generally form the supporting-wire F', the loop F, and the projecting ends F'' of a single piece of wire so bent and formed as to embody these several parts.

Having thus fully described my invention, what I claim as new, and desire to secure by Letters Patent of the United States, is—

1. In a steam-cooker, a case having longitudinally-creased receptacles, annular inwardly-pressed beads and apertures through the sides, a bail supported in the longitudinal receptacles, the lower end bent at right angles and approaching toward the center, thence bent at right angles and extending parallel toward the periphery, a perforated bottom pivotally attached to said bail, a sliding latch upon the bottom, hooks formed at the ends of said latch and arranged to pass through an aperture in the case, and a cover, substantially as and for the purpose set forth.

2. In a steam-cooker, a case having longitudinally-creased receptacles, annular inwardly-depressed beads, and apertures through the sides, a bail supported in the longitudinal receptacles, the lower ends of the bail bent at right angles approaching the center and again bent at right angles approaching the periphery of the case, a bottom pivoted to the lower end of the bail, a sliding latch attached to the bottom with hooks formed at the ends in position to extend and pass through an aperture in the side of the case or withdraw and engage the ends of the bail, holding the bottom rigid at right angles to the bail, and a cover, substantially as and for the purpose set forth.

3. In a steam-cooker, a case having longitudinally-creased receptacles, annular inwardly-depressed beads, and apertures through the sides, a bail supported in the longitudinal receptacles, the lower end thereof bent to approach the center then bent to extend parallel toward the periphery of the case, a bottom pivoted to the bail, a sliding latch connected with the bottom and having hooks at the ends, and a top having supporting-wire formed with a loop and retaining-hooks, substantially as and for the purpose set forth.

Signed at Grand Rapids, Michigan, June 25, 1903.

WALTER J. KENNEDY.

In presence of—
ITHIEL J. CILLEY,
ANDREW ALLGIER.